No. 756,158. PATENTED MAR. 29, 1904.
L. J. COUCH.
WIRE ROPE CLAMP.
APPLICATION FILED JULY 7, 1903.

NO MODEL.

Witnesses:
F. G. Campbell
E. M. Lowe.

Inventor:
Levi J. Couch, by
Harry R. Williams
Atty.

No. 756,158. Patented March 29, 1904.

UNITED STATES PATENT OFFICE.

LEVI J. COUCH, OF SPRINGFIELD, MASSACHUSETTS.

WIRE-ROPE CLAMP.

SPECIFICATION forming part of Letters Patent No. 756,158, dated March 29, 1904.

Application filed July 7, 1903. Serial No. 164,551. (No model.)

*To all whom it may concern:*

Be it known that I, LEVI J. COUCH, a citizen of the United States, residing at Springfield, in the county of Hampden and State of Massachusetts, have invented certain new and useful Improvements in Wire-Rope Clamps, of which the following is a specification.

This invention relates to a device for clamping one section of a wire rope or cable to another section of the rope or cable. This device, however, is more particularly intended for clamping the end of a wire cable to another section of the cable for the purpose of forming a loop.

The object of the invention is to provide a simple, cheap, and strong device which is easily adjusted and set so as to powerfully clamp the end of the cable and which can be quickly loosened so as to unclamp the end and allow the removal of the cable without completely separating the parts of the clamp.

This clamp has a hook adapted to embrace the cable, with a threaded stem extending from one limb of the hook and a nut turning on the threaded stem and adapted to force a clamp-block that is movable on the stem into the opening in the hook, so as to squeeze the cable-sections together.

Figure 1:
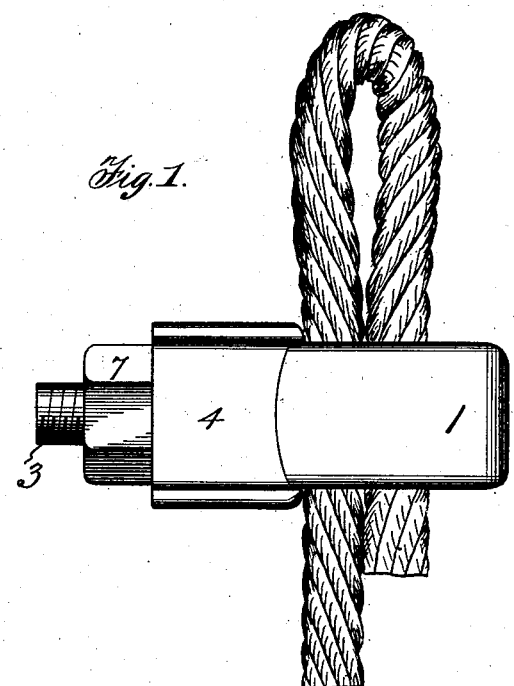
Figure 2:
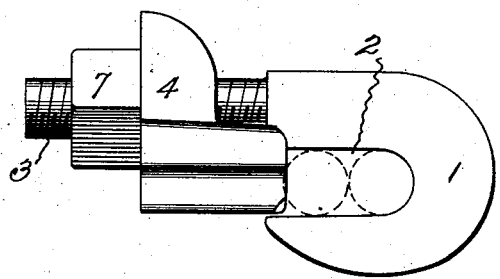
Figure 3:
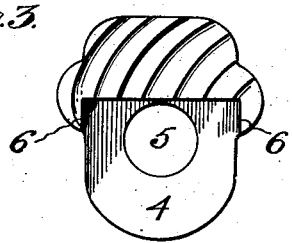

Figure 1 of the accompanying drawings shows a side elevation of this clamp securing an end of a wire cable. Fig. 2 shows a plan of the clamp, and Fig. 3 shows a face view of the clamp-block.

The hook 1 of this clamp may be made of any suitable material, and the opening 2 between the limbs of the hook is preferably approximately the same width as the diameter of the cable and somewhat deeper than twice the diameter of the cable which is to be clamped. The threaded stem 3, which extends from one of the limbs of the hook, is provided with a common screw-thread.

The clamp-block 4 has a perforation 5, that is slightly larger than the threaded stem upon which it moves, and the front end of the block, which is adapted to enter the opening between the limbs of the hook, is roughened, so as to fit the strands of the cable. A lip 6 extends from each side of the block over the sides of the hook to prevent the block from being drawn out of position in the opening by any strains on the cable. The nut 7, which may be of any common form, has threads that fit the threaded stem on which it turns.

The hook is drawn about the sections of the cable to be clamped together, and then the clamp-block is moved up by turning the nut and the sections squeezed together in the opening. The threaded stem is so long that without completely removing the nut the block may be moved back sufficiently to allow it to be turned around to permit the insertion into or removal from the hook of the sections of the cable.

This device is cheap to make and is easily engaged with the sections of cable to be clamped without completely separating the parts. When the nut is turned up, the cable-sections are held positively against separation. With this clamp wire ropes or cables, particularly such as are used for theatrical purposes which require frequent changing, can be quickly joined or looped.

I claim as my invention—

A wire-rope clamp consisting of a hook having parallel limbs of unequal length, the longer limb being threaded for a portion of its length, a block having a clamping portion adapted to pass into and out of the opening between the hook-limbs and an offset portion with a smooth perforation that fits the threaded limb of the hook, the said block being movable longitudinally on the threaded portion of the hook for moving the clamping portion into and out of the opening between the limbs of the hook and being rotatable upon the threaded limb when the clamping portion is drawn back from the opening between the limbs of the hook, and a nut turning on the threaded limb of the hook outside of the block and adapted to force the block toward the opening in the hook, substantially as specified.

LEVI J. COUCH.

Witnesses:
ETHEL M. LOWE,
HARRY R. WILLIAMS.